United States Patent
Kim et al.

(10) Patent No.: US 7,624,168 B2
(45) Date of Patent: Nov. 24, 2009

(54) MULTI-LAYER SYSTEM FOR SCALABLE HOSTING PLATFORM

(75) Inventors: Jooyong Kim, Des Plaines, IL (US); Jason Michael Abate, Chicago, IL (US); Lucas Joon Roh, Chicago, IL (US)

(73) Assignee: Hostway Corporation, Chicago, IL (US)

( * ) Notice: Subject to any disclaimer, the term of this patent is extended or adjusted under 35 U.S.C. 154(b) by 576 days.

(21) Appl. No.: 11/346,591

(22) Filed: Feb. 2, 2006

(65) Prior Publication Data

US 2007/0180116 A1 Aug. 2, 2007

(51) Int. Cl.
 *G06F 15/173* (2006.01)
(52) U.S. Cl. .................. 709/223; 709/224; 709/217; 718/105
(58) Field of Classification Search ............. 709/223, 709/224, 201, 217, 219; 718/105
See application file for complete search history.

(56) References Cited

U.S. PATENT DOCUMENTS

| | | | | |
|---|---|---|---|---|
| 5,774,660 | A * | 6/1998 | Brendel et al. | 709/201 |
| 5,793,976 | A * | 8/1998 | Chen et al. | 709/224 |
| 5,828,847 | A * | 10/1998 | Gehr et al. | 709/239 |
| 6,173,322 | B1 | 1/2001 | Hu | |
| 6,304,967 | B1 | 10/2001 | Braddy | |
| 6,330,602 | B1 * | 12/2001 | Law et al. | 709/224 |
| 6,560,717 | B1 * | 5/2003 | Scott et al. | 714/4 |
| 6,590,861 | B1 * | 7/2003 | Vepa et al. | 370/216 |
| 6,748,413 | B1 * | 6/2004 | Bournas | 718/105 |
| 6,938,256 | B2 | 8/2005 | Deng et al. | |
| 6,954,456 | B2 * | 10/2005 | Cranor et al. | 370/356 |
| 7,197,547 | B1 * | 3/2007 | Miller et al. | 709/223 |
| 7,284,055 | B1 * | 10/2007 | Oehrke et al. | 709/226 |
| 7,299,294 | B1 * | 11/2007 | Bruck et al. | 709/235 |
| 7,321,925 | B2 * | 1/2008 | Trethewey | 709/219 |
| 7,421,497 | B2 * | 9/2008 | Rosenbach et al. | 709/225 |
| 7,423,977 | B1 * | 9/2008 | Joshi | 370/252 |
| 7,454,425 | B2 * | 11/2008 | Che et al. | 707/10 |
| 2002/0026560 | A1 | 2/2002 | Jordan et al. | |
| 2002/0049840 | A1 * | 4/2002 | Squire et al. | 709/225 |

(Continued)

FOREIGN PATENT DOCUMENTS

JP 2002-150000 5/2002

(Continued)

OTHER PUBLICATIONS

"A Delicate Balance-Load Balancing Switches and Routers May be a Good Option if Your Company Needs the Kind of Scalability that Clustering Doesn't Offer Yet;" *Information Week;* 1999, p. 57.

(Continued)

*Primary Examiner*—Lashonda T Jacobs
(74) *Attorney, Agent, or Firm*—Brinks Hofer Gilson & Lione (57) ABSTRACT

A hosting platform includes a main server layer and an auxiliary server layer. The main server layer includes one or more servers and a server of the one or more servers is designated to process requests for one or more hosts. The auxiliary server layer may be removably coupled to and in communication with the main layer. The auxiliary layer may process the request redirected from the main layer when the designated server of the main layer is overloaded.

31 Claims, 5 Drawing Sheets

U.S. PATENT DOCUMENTS

| | | | |
|---|---|---|---|
| 2002/0091760 A1* | 7/2002 | Rozen | 709/203 |
| 2002/0194350 A1* | 12/2002 | Lu et al. | 709/229 |
| 2003/0069968 A1 | 4/2003 | O'Neil et al. | |
| 2003/0105797 A1 | 6/2003 | Dolev et al. | |
| 2003/0120724 A1* | 6/2003 | Kawashimo et al. | 709/203 |
| 2003/0187982 A1 | 10/2003 | Petit | |
| 2004/0030755 A1* | 2/2004 | Koning et al. | 709/217 |
| 2004/0162901 A1 | 8/2004 | Mangipudi et al. | |

FOREIGN PATENT DOCUMENTS

| | | |
|---|---|---|
| WO | WO 99/18534 | 4/1999 |

OTHER PUBLICATIONS

"Global Load Balancews-Pointing Web Requests in the Right Direction;" *Data Communications;* 1999, p. 61.

"Sever Switching: Yesterday and Tomorrow;" *Proceedings of the Second IEEE Workshop on Internet Applications (WIAPP '01)*, Jul. 2001.

"Redmond Print:Balancing Act;" http://www.remondmag.com/features/print.asp?EditorialsID=288, printed Oct. 18, 2005, 7 pages.

\* cited by examiner

MULTI-LAYER SYSTEM FOR SCALABLE HOSTING PLATFORM

BACKGROUND OF THE INVENTION

1. Technical Field

This invention relates to a scalable hosting platform and more particularly, to a multi-layer system for a scalable hosting platform.

2. Related Art

In a hosting environment, a single hosting server may provide services to a number of hosts. This may reduce hosting cost. However, a shared single server may be overloaded depending on a number of requests for hosts, types of requests, etc. The overloaded single server may lack scalability.

To overcome lack of scalability, a load balancer may be disposed in front of a cluster of hosting servers and distributes requests to the hosting servers. The load balancer is a popular tool to support scalability of hosting servers. Hosts usually share one Internet Protocol (IP) address. To differentiate hosts having the one IP address, an application level load balancer may be needed. The application level load balancer may recognize each host despite the one IP address and provide separate scalable service to each host.

It is well appreciated in the art that a network framework may be defined with multiple layers including an application layer, a transport layer (e.g., Transmission Control Protocol ("TCP") layer), a network layer (e.g. IP layer), and a physical layer. The application layer corresponds to the Open System Interconnection ("OSI") layer 7, and the transport layer corresponds to the OSI layer 4. Recognizing specific information at higher layers may require higher overhead, which may lead to a lower throughput. For instance, a layer 7 (L7) load balancer may have a lower throughput than a layer 4 (L4) load balancer. As a result, the L7 load balancer, although it is able to distinguish multiple hosts sharing the one IP address, may reduce overall scalability.

The load balancer also may be a single point of failure. Specifically, if the load balancer fails, all of hosting servers will fail accordingly. This may result in unavailability of hosting services. High Availability (HA) solutions may relieve this failure of the load balancer. One example of HA solutions includes primary and secondary load balancers. The secondary load balancer may replace the primary load balancer in case of failure of the primary load balancer. HA solutions may not be, however, free from failure. The failure of HA solutions may result in unavailability of hosting services.

SUMMARY

In one embodiment, a scalable hosting platform may include a multilayer architecture. The hosting platform includes a main server layer and an auxiliary server layer. The main server layer includes a plurality of servers. A server of the plurality of servers is designated to process requests for a plurality of hosts. The auxiliary server layer may be removably coupled to and in communication with the main layer. The auxiliary server layer may process the request redirected from the main server layer when the designated server of the main server layer is overloaded.

In other embodiment, a scalable hosting platform includes a first server of a first layer configured to serve multiple hosts. A designated server of the first server is associated with a host and responds to a request for the host. The scalable hosting platform further includes a second server of a second layer that processes the request upon redirection of the request from the first layer. The scalable hosting platform further includes a monitoring module and a manager. The monitoring module monitors the first server and determines an overloaded condition of the first server. The monitoring module further classifies the request. The manager monitors the status of the second server and identifies a group of the second server associated with a classification of the request. The manager further dynamically changes the association based on the status of the second server.

In another embodiment, a scalable hosting method for use with a multilayer architecture is provided. In the hosting method, a status of a first hosting server is monitored. A request for a host is redirected to a second hosting server upon determination that the status of the first hosting server is overloaded. The status of the second hosting server is monitored. The redirected request is assigned to the second hosting server when the second hosting server has a classification consistent with the redirected request and is not overloaded. The redirected request may be assigned to a third hosting server when the second hosting server is not available. A classification of the third hosting server is changed to have the classification of the redirected request.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
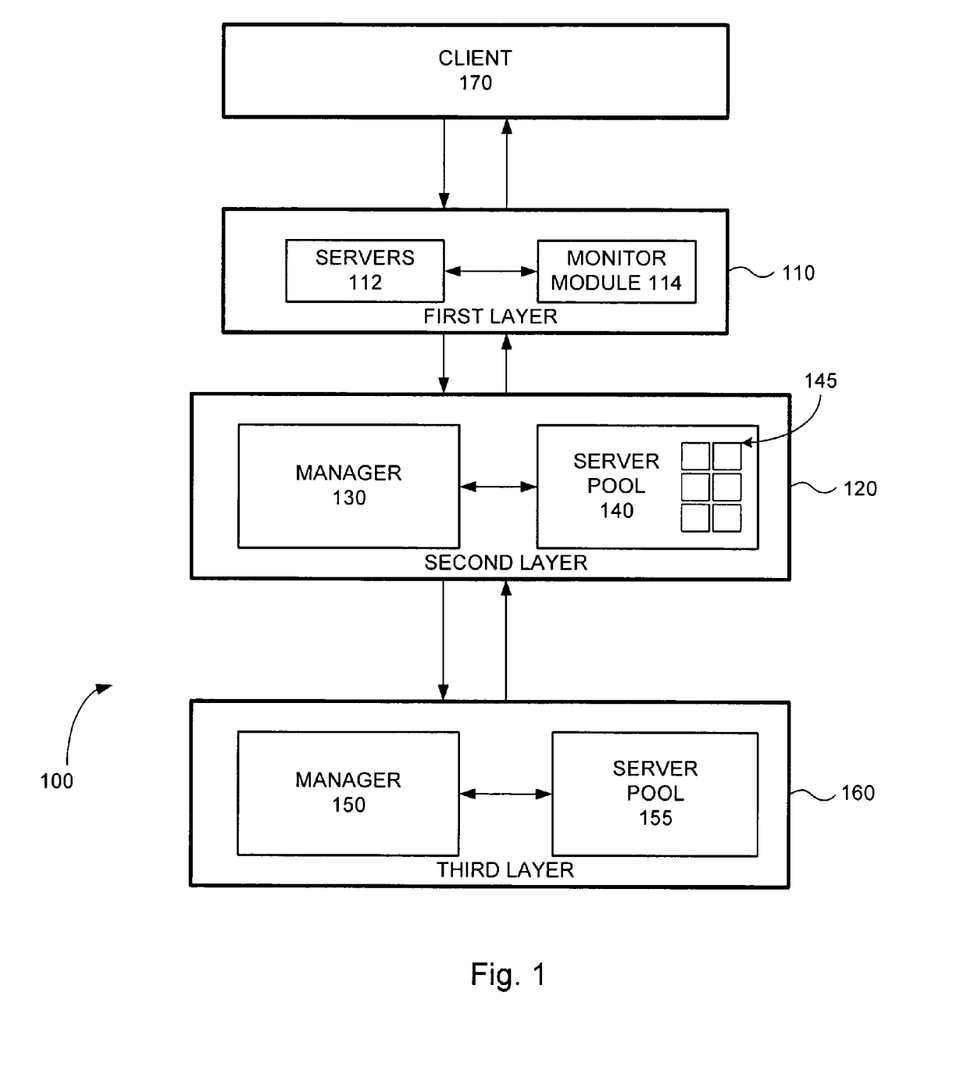
FIG. 1 is a block diagram illustrating one embodiment of a multi-layer system for a scalable hosting platform.

FIG. 1 is a block diagram illustrating one embodiment of a multi-layer system 100 for a scalable hosting platform. The multi-layer system 100 includes a first layer 110, a second layer 120 and a third layer 160. In other embodiment, the multi-layer system 100 may include more or fewer layers.

The multi-layer system 100 operates under a hosting environment. A client 170 sends requests to and receives responses from the multi-layer system 100. In this embodiment, requests are web based requests. In other embodiment, other types of requests may be used. The client 170 includes a number of user computers, workstations, or any other data processing devices. The multi-layer system 100 provides the hosting service to the client 170.

In the multi-layer system 100, the first layer 110 may operate as a main layer and the second and third layers 120 and 160 may operate as an auxiliary layer to the main layer. The first layer 110 initially receives a request from the client 170 and processes it. As will be described later, the first layer 110 may redirect the request to the auxiliary layer upon occurrence of an overloaded condition. The auxiliary layer may process and/or respond to the redirected request on behalf of the first layer 110.

The first layer 110 includes a plurality of servers 112. In other embodiment, the first layer 110 may include a single server. The plurality of servers 112 provides internet hosting service to the client 170. For instance, the plurality of servers 112 may be web hosting servers. Each server may be shared by multiple hosts. A host provides an internet service and is represented with a domain name or an IP address. In web applications, a host indicates a website, or web host. In other internet applications, a host may provide streaming service, shell accounts, file transfer protocol (FTP) access, etc. By way of example, one server may be shared by 500 hosts. The plurality of servers 112 may be connected directly to the internet. Alternatively, the servers 112 may be connected via redirectors, such as a proxy, a firewall, a load balancer, etc.

The first layer 110 also includes a monitor module 114. The monitor module 114 may reside in each one of the servers 112. The monitor module 114 preferably may be implemented in software. For instance, the monitor module 114 may be built as a web or media server module on the servers 112. In other embodiment, the monitor module 114 may be disposed separately from the servers 112. For instance, the monitor module 114 may be implemented in a dedicated server that manages the servers 112. The monitor module 114 may be assigned to each server. Alternatively, the monitor module 114 may be shared by several servers in the first layer 110.

The monitor module 114 operates to monitor conditions of the plurality of servers 112. The monitoring by the monitor module 114 may be periodic and regular. The monitor module 114 monitors various factors such as CPU load, memory usage, a number of processes, a number of connections, etc. of the servers 112. The monitoring module 114 may measure usage consumption of multiple hosts. Upon monitoring of these factors, the monitor module 114 determines whether each server of the plurality of servers 112 may have an overloaded condition. An overloaded condition occurs when incoming requests for hosts exceed capacity of a server designated to serve hosts and requests may not be processed or experience delayed processing.

The monitor module 114 further monitors usage consumption of each host. For instance, a first host may have higher usage consumption than that of a second host. Also, the first host and the second host may have threshold usage consumptions assigned by their service contracts. The monitor module 114 determines whether the actual usage consumption is within the scope of the threshold usage consumption. For example, if the first host has the lower threshold usage consumption and requests services beyond the threshold usage consumption, the monitor module 114 may monitor and note this discrepancy. The first host's request beyond the threshold usage consumption may be treated with lower priority.

The monitor module 114 may engage in classification of requests from the client 170. The requests from the client 170 may be classified based on a pathname, a domain name where the requests have been sent, the amount of capacity used by hosts, etc. Classification may associate each request with a predetermined identification, for example, class 1, 2, ... N (N=natural number).

Classification may indicate a different quality of service. For example, the requests to a host having the domain name, "www.oldmov.com" may be entitled to a high quality service. Additionally, among the requests to the host, a request to "/members/" directory may be classified into a higher class. In another example, if a host exhausts the threshold usage capacity, the requests to the host may be directed to a low class.

To classify and redirect the requests, the monitor module 114 may control the requests in the application layer. In other embodiment, the monitor module 114 may control the requests in the transport layer or the network layer such as the IP layer. For instance, the monitor module 114 may be implemented in a web server module on the servers 112. The monitor module 114 is able to translate the classification to information that the second layer 120 may understand. As examples, the second layer may understand IP addresses or another domain name and the monitor module 114 translates the classification to the IP addresses or domain names. As noted above, the monitor module 114 may be assigned to each server 112. A request from the client 170 is sent to each server 112 and the monitor module 114 in each server 112 engages in the classification of the request.

The second layer 120 includes a manager 130 and a shared server pool 140. The manager 130 supervises and monitors the shared server pool 140. The manager 130 is in communication with the first layer 110. The manager 130 may receive some or all of requests from the first layer 110. The manager 130 multiplexes the requests into the shared server pool 140. Operation of the manager 130 will be described in detail later in conjunction with FIG. 3. The shared server pool 140 includes a plurality of servers 145. The plurality of servers 145 is able to process the functions that the servers 112 of the first layer 110 process. Alternatively, the servers 145 may process a partial function, compared to that of the servers 112. The servers 145 are able to process and respond to the requests on behalf of the servers 112 of the first layer 110. The responses processed by the servers 145 may be returned to the first layer 110, which returns them to the client 170. In other embodiment, the responses may be directly sent from the servers 145 to the client 170. This may differ depending on redirection solutions used at the first layer 110.

The second layer 120 may be located at the same data center as the first layer 110. In other embodiment, the second layer 120 may be located at a remote data center. The second layer 120 may be attached to or detached from the first layer 110. The second layer 120 has flexible connection to the first layer 110.

A third layer 160 may be in communication with the second layer 120. The third layer 160 includes a manager 150 and a shared server pool 155. The manager 150 operates to supervise the shared server pool 155. The third layer 160 may process requests from the first layer 110 when the second layer 120 is overloaded. The manager 150 may be in communication with the manager 130 and receive assistance requests from the manager 130. The manager 150 may supervise the status of the shared server pool 155 and upon the receipt of assistance requests, it determines that the shared server pool 155 is available for processing the requests from the first layer 110. Upon determination of availability of the shared server pool 155, the manager 150 allocates the requests to the shared server pool 155. The shared server pool 155 may include a plurality of servers that is able to fully or partially process the requests from the first layer 110 and the second layer 120.

In FIG. 1, the second layer 120 and the third layer 160 operate as the auxiliary layer. In other embodiment, the second layer 120 and/or the third layer 160 may operate as a main layer. The monitor module 114 may monitor whether the second layer 120 is available for processing of the request. Alternatively, another module may be added in the servers 112 of the first layer 110 to monitor the availability of the second layer 120 on an interval basis. Likewise, the second layer 120 may also monitor the availability of the third layer 160 for redirection and/or processing of the requests. This monitoring may permit the second and third layers 120 and 160 to be freely attached to or detached from the first and second layers 110 and 120.

The third layer 160 may be detached from the second layer 120. The third layer 160 may be used as a second layer in connection with another first layer. In other embodiment, apart from the first, the second and the third layers 110, 120 and 160, a fourth layer, a fifth layer or more layers may be added in the multi-layer system 100. Managers such as the managers 130 and 150 of each layer may actively supervise the servers and allocate requests in such layers.

Figure 2:
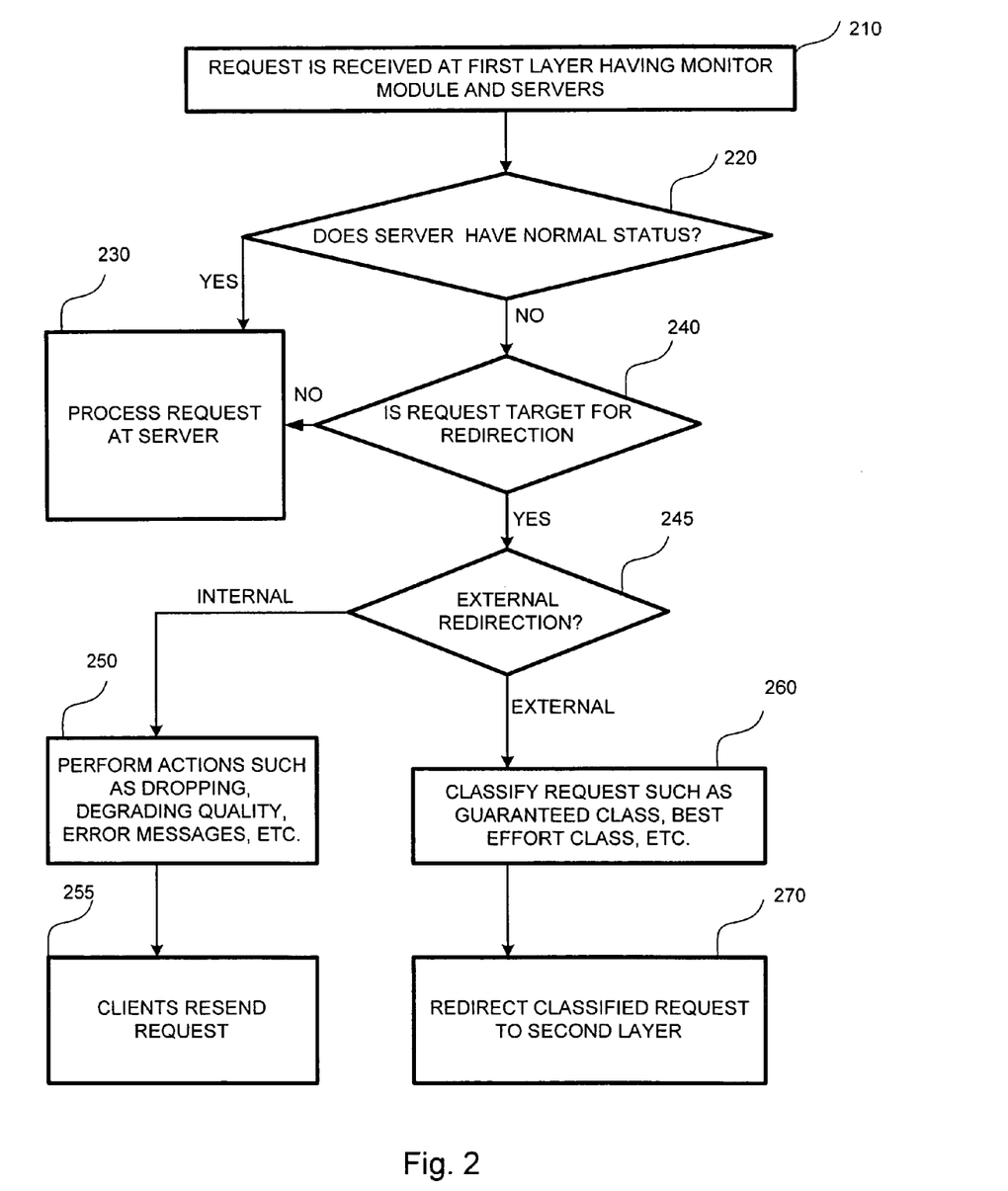
FIG. 2 is a flowchart illustrating operation of a first layer of the multi-layer system of FIG. 1.

FIG. 2 is a flowchart illustrating operation of the monitor module 114 of FIG. 1. A request is received at one server of the servers 112 of the first layer 110 where the monitor module 114 and the servers 112 are disposed (act 210). One server may be designated to handle requests for multiple hosts. A single host may be served by this designated single server. The monitor module 114 may determine whether the received request is processed at the designated server of the first layer 110 or sent to the second layer 120. To make this determination, the monitor module 114 may monitor the status of the designated servers 112 (act 220). The monitor module 114 may measure usage consumptions of each host and server conditions such as CPU load, memory usage, etc. Upon determination that the status of the designated server is normal, the designated server processes the request (act 230).

If the status of the designated server is overloaded, the monitor module 114 checks whether the request is a target for redirection (act 240). For instance, a request for some dynamic pages may be a target for redirection and may be configured to be redirected to the second layer 120. If the request may not be the target for redirection, it is passed to the designated server of the first layer 110 (act 230). If the request is the target for redirection, it is determined that the redirection may be internal, or external (act 245). The internal redirection may correspond to local redirection within the first layer 110, whereas the external redirection may correspond to redirection beyond the first layer 10. As a result of the internal redirection, the designated server may provide a different object to the client.

By way of example, the servers 112 may perform actions such as "dropping," "degrading the quality," etc. (act 250). The servers 112 perform a dropping action by not processing, i.e., dropping the request. The client 170 may or may not see some error messages such as "The server does not respond." or "Server Failure" (act 250). In this way, the client 170 may be informed that the servers 112 do not operate properly. The client 170 may need to resend the request (act 255). Alternatively, the servers 112 may perform an action of lowering the quality of a response. One example of lowered-quality performances is redirecting dynamic pages to static pages showing messages such as "Try again later." The client 170 may send a new request later (act 255). Another example may be redirecting a request for media files to low quality files. For the internal redirection exemplified above, the servers 112 are able to inform the client 170 of the overloaded status.

If the request is the target for external redirection, the request may be classified (act 260). The classification may depend on classes exported by the second layer 120. The second layer 120 may preserve one or more classes and may differentiate the quality of service for each class. For instance, the servers 140 may include a total of 20 servers: 10 servers, 5 servers and 5 servers may be assigned to three different classes, respectively. By way of example, 10 servers may be assigned to Class 1, 5 servers to Class 2 and 5 serves to Class 3. Classes 1-3 may indicate the different quality of services. Classes 1-3 may be represented and identified with their own IP addresses or network addresses. The network addresses may include port numbers of incoming requests in addition to IP addresses. For instance, Class 1 has the IP address, 1.1.1.1, the IP address 1.1.1.2 for Class 2 and the IP address 1.1.1.3 for Class 3.

In the second layer 120, the differentiation of the classification may be done by combining clustering solutions and/or virtual server solutions. Clustering solutions assign one or more servers for each class, as described in the above example. Virtual server technologies may include virtual private server, virtual machine and virtual machine monitor. The virtual server technologies may abstract a computer's physical resources into virtual resources and isolate the performance. For virtual servers, users may feel that they are using dedicated servers. Virtual machine solutions may involve a single server. For example, 70% of a single server may be assigned to one class and 30% to the other class. These capacity assignments may be done dynamically. The classification (act 260) is performed in accordance with the multiple classes preserved by the second layer 120. If the second layer 120 preserves four classes, classification into the four classes are made at the first layer 110 (act 260).

By using the above example, the classification of the request (act 260) is performed such that the request is assigned with Classes 1-3. The monitor module 114 classifies a certain request with Class 1 and may translate Class 1 to the IP address 1.1.1.1. The monitor module 114 may translate the class information to other types of information, such as domain names. Alternatively, the monitor module 114 may not translate the class information and pass related information to the second layer 120. Actual translation may be made at the second layer 120.

After the classification, the monitor module 114 redirects the request to the second layer 120 (act 270). The redirection may include proxying, Network Address Translation (NAT), application level redirection such as Hyper Text Transfer Protocol (HTTP) redirection, or L4/L7 load balancing, etc. If the redirection is performed with proxying, the second layer 120 returns the response to the first layer 110, which forwards the response to the client 170. If the redirection is performed with application level redirection, the second layer 120 may return the response to the client 170 directly.

Figure 3:
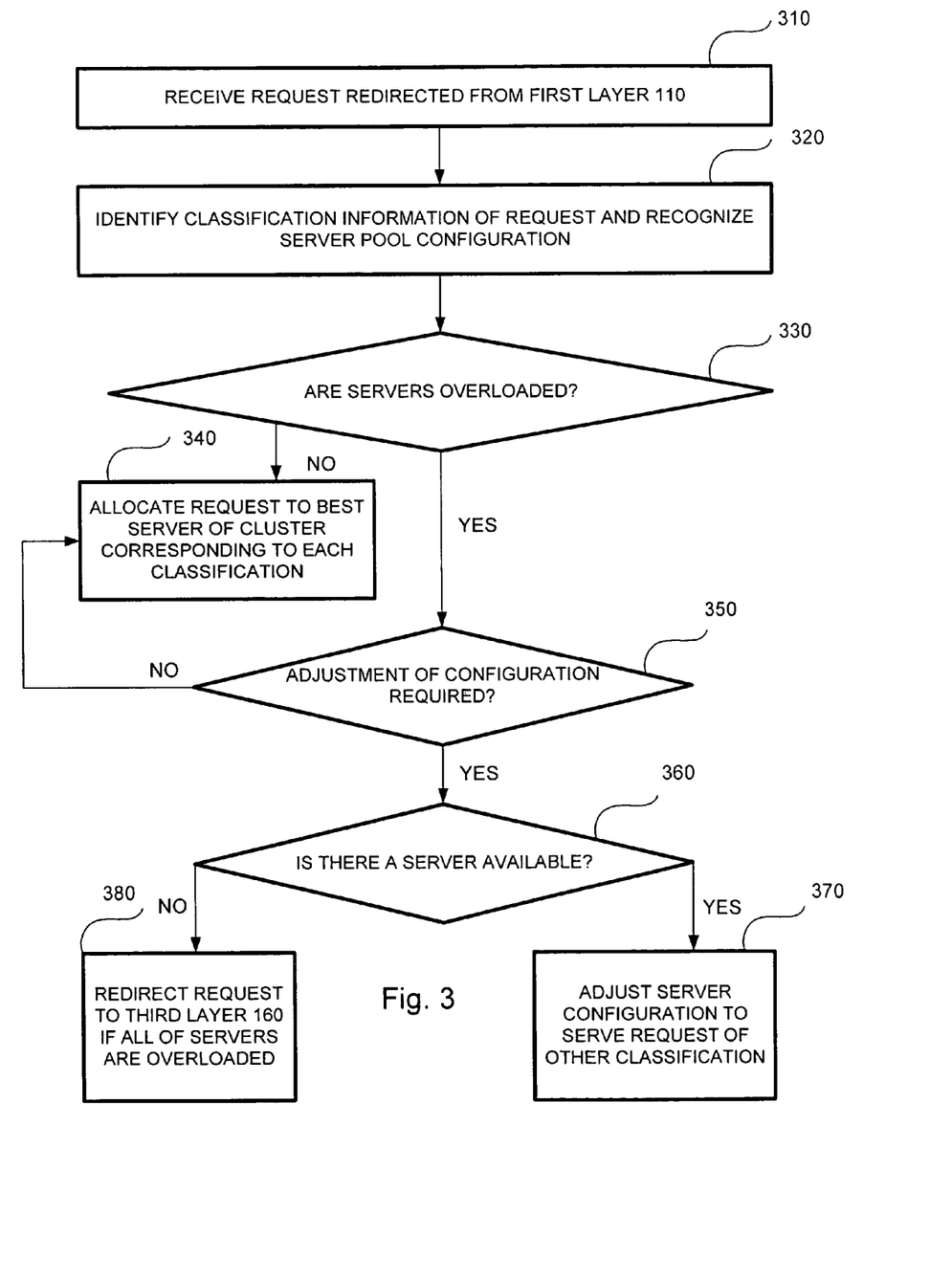
FIG. 3 is a flowchart illustrating operation of a second layer of the multi-layer system of FIG. 1.

FIG. 3 is a flowchart illustrating operation of the manager 130 of FIG. 1. The manager 130 receives the request redirected from the first layer 110 (act 310). The request includes the classification information. The classification information may be represented with the IP address. Alternatively, the classification information may be translated into the IP address by the manager 130 after being received at the second layer 120. The manager 130 recognizes the classification and configuration of the server pool 140 (act 320). The clusters of the servers 140 may be set to reflect the classification information. For instance, if the classification includes two classes such as guaranteed class and best effort class, the servers 140 may be configured to preserve two clusters. Specifically, one cluster of servers may be assigned to the guaranteed class and the other cluster of servers may be assigned to the best effort class. If the classification includes two or more classes, the servers 140 may be configured accordingly. By way of example, 5 servers are assigned to the guaranteed class and 3 servers are assigned to the best effort class. The 5 servers have a first IP address corresponding to the guaranteed class and the 3 servers have a second IP address corresponding to the best effort class. By using the above example, the manager 130 considers the IP address of the redirected request and the IP address of the server cluster. Based on the match of two IP addresses, the manager 130 determines that the request is to be assigned to the cluster of servers having the first IP address or cluster of the servers having the second IP address.

The manager 130 monitors the status of the servers 140 (act 330). The manager 130 determines whether the configuration of the servers 140 is able to properly serve the classified request. For instance, the manager 130 determines whether a particular cluster of the servers 140 may be overloaded or not (act 330). Also, the manager 130 determines which server in the same cluster is the most available. The manager 130 allocates the request to the server cluster according to the classification and further allocates it to the most available server among the server cluster (act 340). The manager 130 may operate as a load balancer such that a best server 145 responds to the redirected request (act 340).

The monitoring of the status of the server cluster (act 330) may be performed continuously. As described above, the monitoring (act 330) is used to distribute load among the servers of the relevant server cluster. The monitoring (act 330) also may be used to perform dynamic configuration of the server clusters. Dynamic configuration may adjust or change the configuration of the server clusters. For instance, the servers assigned to one class may be adjusted to be used for the other class because the servers belonging to the other class are overloaded. Dynamic configuration may or may not be performed on a request basis. Regardless of incoming requests, the dynamic configuration may be performed by the manager 130 based on the monitoring information. Alternatively, the dynamic configuration is possible to address a particular incoming request.

By using examples of the guaranteed class and the best effort class, the manager 130 continuously monitors the status of the servers 140 (act 330) and determines that the cluster of the servers for the guaranteed class is overloaded. The manager 130 also determines that other clusters of the servers may be overloaded or not. The manager 130 considers various factors that lead to determine the overloaded status of the clusters of the servers 140. For instance, CPU and memory usage, a number of processes, a number of connections, etc. are considered.

The manager 130 determines that 3 servers of the best effort class are all overloaded as a result of the monitoring (act 330). The manager 130 may change the configuration such that 2 servers of the guaranteed class may be used for requests corresponding to the best effort class. Because requests corresponding to the guaranteed class are entitled to the higher quality of service than those corresponding to the best effort class, the manager 130 may limit the extent of the dynamic configuration. For instance, although 4 servers of the guaranteed class are available, the manager 130 may allow only 2 servers of the guaranteed class to be available for the best effort class.

Prior to the dynamic configuration (act 370), the manager 130 may need to determine whether there are available servers in any server cluster (act 360). All of the servers may be overloaded. In that case, the manager 130 may redirect the request to the third layer 160 (act 380). The manager 130 determines periodically whether the third layer 160 may be available and ready to process the redirected request. For this purpose, the manager 130 may be in communication with the manager 150.

The dynamic configuration (act 370) by the manager 130 may occur at any time. The monitoring (act 330) continues and identifies overloaded status of the servers 145. The manager 130 may perform the dynamic configuration based on the monitoring result. Alternatively, the dynamic configuration (act 370) may be performed on a request basis. If a particular cluster of the servers is no longer overloaded, the changed configuration of the cluster may return to the original configuration and the monitoring (act 330) of the server status continues.

In case servers of several classes are overloaded, servers of a lower class may be assigned to process requests on behalf of servers of a higher class. After dynamic configuration of servers, overloaded status of the servers may still remain. A new server may be added to the second layer 120 to resolve the ongoing overloaded status.

Figure 4:
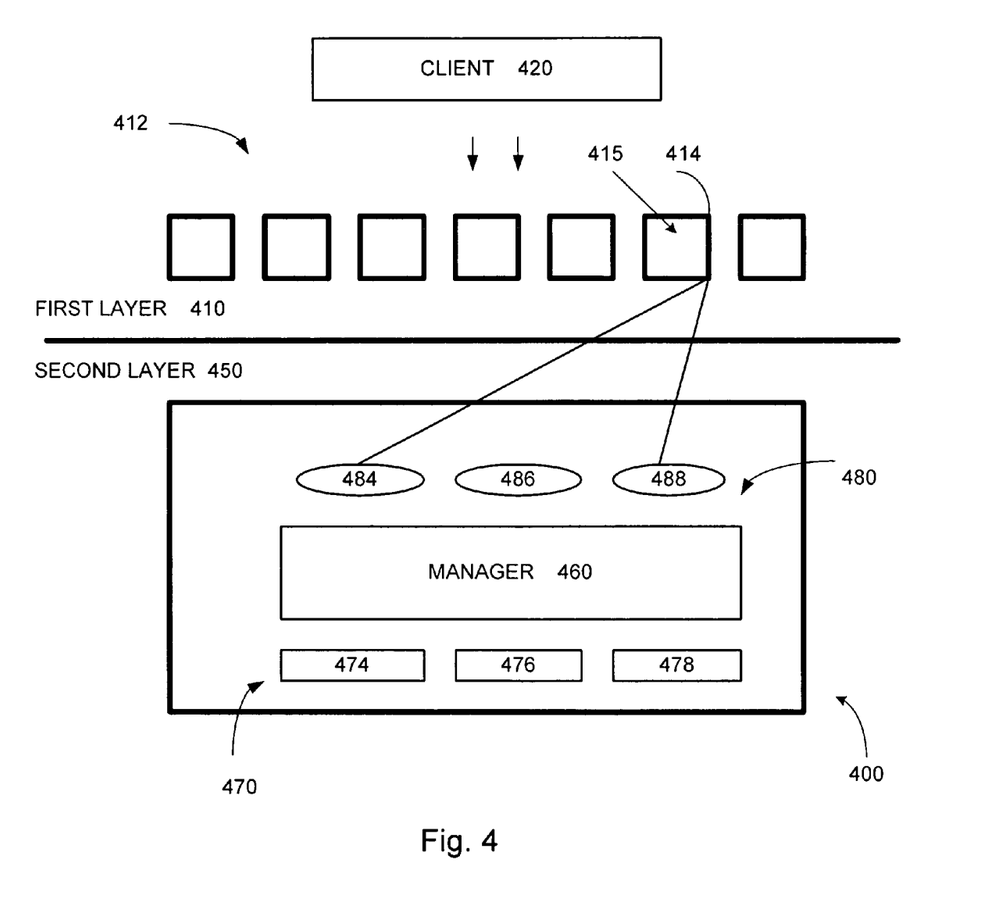
FIG. 4 is a block diagram illustrating an embodiment of a two-layer architecture for a scalable hosting platform.

FIG. 4 is a block diagram illustrating an embodiment of two-layer system 400 for a hosting platform. The two-layer system 400 includes a first layer 410 and a second layer 450. The first layer 410 includes a plurality of first servers 412. The second layer 450 includes a manager 460 and a plurality of second servers 470. In this embodiment, the servers 470 are divided into three servers groups 474, 476 and 478. In this embodiment, three classes 484-488 are preserved. A client 420 sends a request to the first layer 410.

In one example, the multi-layer system 400 operates as follows. One server 415 of the servers 412 in charge of a particular host receives a request for that host. A monitor module 414 residing in the server 415 periodically checks the status of the server 415 and determines whether the server 415 is overloaded or not. In this embodiment, the monitor module 414 may be implemented with a software tool. Upon determination of no overload condition, the server 412 processes the request and responds to the request. In other embodiment, the monitor module 414 may reside separately from the server 415. Upon determination of overload condition, the monitor module 414 may redirect the request to the second layer 450. The monitor module 414 classifies the request based on the URL of the request, the domain name of the request, the IP address of the request, the amount of usage consumption by the host, the threshold usage consumption of the host, an application level data of the request, etc. For instance, the application level data of the request includes HTTP header information for a web request. The IP address of the request may include source address and destination address. The classification may be made before the requests are sent to the second layer 450. As an exemplary classification, the request may be classified as a guaranteed class. Other classes such as a preferred class, a normal class, an economy class, etc. may be available. The guaranteed class may indicate that high quality performance may be guaranteed for the request, regardless of overloaded servers.

The request with this classification is sent to the second layer 450. The manager 460 may receive this request. The manager 460 supervises and monitors the servers 470 of the server pool. The servers 470 of the server pool may have a default setting for processing the request from the first layer 410. For example, the servers 470 may be grouped as a first group 474, a second group 476 and a third group 478. For instance, the first group 474 may be assigned to the requests classified as guaranteed class, the second group 476 to preferred class, and the third group 478 to economy class, respectively.

The manager 460 may actively engage in allocation of the requests. For the request classified as the guaranteed class, the manager 460 may first consider that a matching default server of the server pool 470 is available. If it is available or idle, the request may be sent to the assigned server. For instance, by using the foregoing example, the request of the guaranteed class is assigned to the first group 474. The manager 460 follows a basic rule that the guaranteed class is processed by the servers designated for the guaranteed class. If every server of the first group 474 is overloaded, the manager 460 may consider changing the configuration of the servers 470. Because the classification is the guaranteed class, the manager 460 determines that this request may require priority processing. The manager 460 is able to actively change the configuration of the servers 470. The change of the configuration occurs continuously. Although a particular server group is configured for a particular class, the particular server group may not be limited to that particular class. Due to dynamic configuration, the particular server group may operate to process requests having different classes. The manager 460 monitors the status of the servers 476 and 478 assigned to lower priority classes such as the economy class and the preferred class. If there are available and suitable servers 476 and 478 among those classes, the manager 460 may change the configuration and allocates the request to one of those servers 476 and 478. Alternatively, if all of the servers are unavailable or overloaded, then the manager 460 may allocate the request to one of the servers 478 of the lowest priority class, regardless of the status of the servers 478. As a result, a designated server 478 in the economy class may be required to give the priority processing to the allocated request. The designated server 478 may drop the request of the economy class.

The manager 460 may receive the processed result from the servers 470 and send it back to the first layer 410. The first layer 410 then submits the received result to the client 420. For this reason, the servers 412 of the first layer 410 and the servers 470 of the second layer 450 may process the same or similar functions. The requests from the first layer 410 may be processed at the second layer 450 in a stable and constant manner. Alternatively, the servers 470 may send the processed result to the first layer 410.

Figure 5:
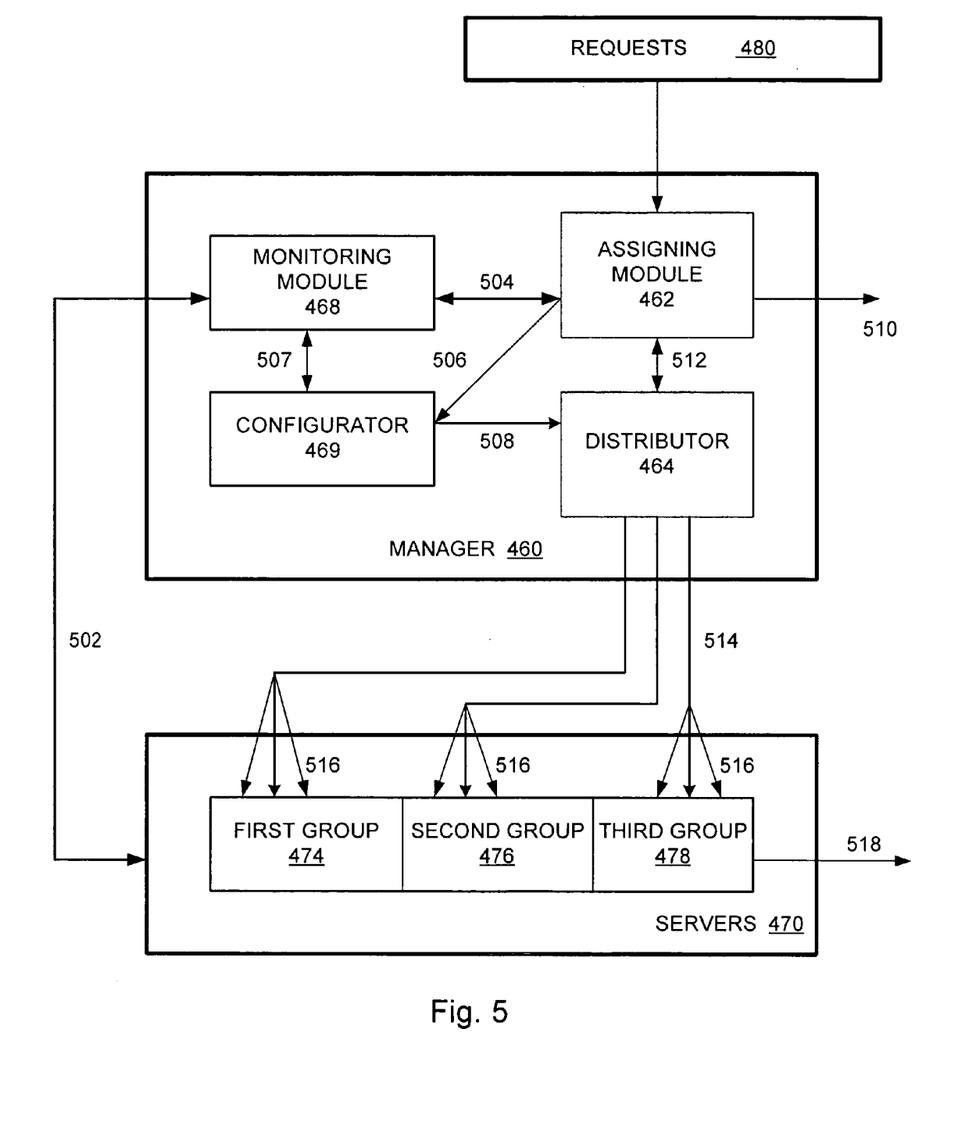
FIG. 5 is a block diagram illustrating an embodiment of a manager for use with the two-layer architecture of FIG. 4.

FIG. 5 is a block diagram illustrating an exemplary structure of the manager 460. The manager 460 includes an assigning module 462, a distributor 464, a monitoring module 468 and a configurator 469. In this embodiment, the assigning module 462, the distributor 464, the monitoring module 468 and the configurator 469 are separate modules, but it is not limited thereto. In other embodiment, the assigning module 462, the monitoring module 468 and the configurator 469 may be incorporated into a single module. Various other construction of modules are possible.

In the manager 460, requests 480 are provided to the manager 460. The assigning module 462 receives the requests 480. The assigning module 462 also receives information on the server cluster configuration of the server 470. The assigning module 462 provides the received requests 480 to the distributor 464 (flow 512). The assigning module 462 may recognize interfaces exported by the distributor 464 and perform mapping between the requests 480 and the interfaces (flow 512). The requests 480 may or may not be classified. If the requests 480 may not be classified, the assigning module 462 may classify the requests 480. The distributor 464 distributes the requests 480 to one of the server groups 474-478 according to the classification.

The manager 460 may operate on a request basis. For the request basis operation, the assigning module 462 obtains information from the monitoring module 468, as indicated by flow 504. The information may indicate status of the servers 470. For instance, if a request is to be processed by the first server group 474, the assigning module 462 checks the status of the first server group 474. Based on the status of the servers 470, the assigning module 462 may request the configurator 469 to change configuration of the servers 470. If the first server group 474 is overloaded, the configurator 469 may change the configuration to the second server group 476 and/or the third server group 478. The assigning module 462 may be omitted if the classification of the requests 470 is performed at the first layer 410 and the manager 460 may not operate on the request basis.

The distributor 464 provides the requests 480 to the servers (flow 514) according to the determined configuration. The determined configuration may designate the server group for each class (flow 514). The determined configuration further may determine load balancing among each server group 474, 476 and 478 (flow 516). For instance, the determined configuration designates the first server group 474 for the guaranteed class and server #3 as the most available server.

The monitoring module 468 monitors the status of the servers 470 (flow 502). In particular, the monitoring module 468 determines whether the first group 474, the second group 476, and the third group 478 are overloaded or not, or whether any group of the servers 470 fails to operate (flows 502). The monitoring may be real-time basis and the monitoring information is reported to the configurator 469 and/or the assigning module 462. The monitoring information may be used by the configurator 469 to change the configuration of the servers 470.

The configurator 469 periodically checks the status information from the monitoring module 468 (flow 507). As a result of reviewing the status information, the configurator 469 may send the distributor 464 commands for changing class configurations (flow 508). When the configuration is changed on the request basis, the configurator 469 may perform the change of the configuration according to communication from the assigning module 462 (flow 506).

Based on the configuration and other information, the distributor 464 chooses a particular server within the server groups 474, 476 and 478. Other information may include a current number of connections and recent assignments. For instance, a request has the classification assigned to the first group 474. The first group 474 may have ten servers assigned thereto. The distributor 464 may determine which server among ten servers may be the best situated to process the request.

If all of the servers 470 are overloaded, the assigning module 462 or the servers 470 determines whether a lower layer is available for redirection and processing. The assigning module 462 or the servers 470 redirects the request to the lower layer (flows 510 and 518).

When the first group 474 is overloaded based on report from the monitoring module 468 (flow 507), the configurator 469 may change the configuration such that a server of the two groups 476 and 478 processes a request on behalf of the first group 474. The configurator 469 sends this changed configuration to the distributor 464 (flow 508). The distributor 464 distributes the requests 480 based on the changed configuration. Because the classification relevant to the first group 474 may have higher priority than those relevant to the second and third groups 476 and 478, the configurator 469 changes the configuration such that a server of the second and third group 476 and 478 drops the current processing and processes the redirected request. On the other hand, when some servers of the first group 474 are available, the distributor 464 may limit the configuration of the first group 474 for use with the second and/or third groups 476 and 478. Accordingly, the quality of service for the first group 474 may be preserved.

As noted in the above embodiments, the multi-layer system allows the overloaded requests to be processed in the lower layers. The overloaded requests are redirected to the lower layers with the classification information. The classification corresponds to the configuration of the server clusters within the lower layers. If the servers of the server clusters are available, or idle, the manager assigns the request to the server cluster having the corresponding classification. The manager monitors the status of the servers in the server cluster and balances the load. However, if such default server cluster is overloaded, the manager actively engages in resolving the overloaded situations. The manager of the lower layers actively monitors the servers and adjusts the configuration of the server clusters. The adjustment may be based on the availability of servers in other server clusters, priority of the classification, etc. As a result, the overloaded requests may be effectively processed by the servers in the lower layers. The lower layers may be detached from or attached to the main layer upon need. Further, the lower layers may not be in the same geographical location. Increased flexibility may be provided to the hosting platform. Furthermore, the multi-layer system may provide improved scalability for each host and may manage different quality of services for hosts.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A scalable hosting platform, comprising:
   a main server layer including one or more servers wherein a server is designated to process a selected request to a selected host from a client; and,
   an auxiliary server layer removably coupled to and in communication with the main server layer, the auxiliary server layer being independently unavailable to the client and processing requests including the selected request upon redirection from the main server layer;
   wherein subsequent to receipt of the selected request at the designated server, the main server layer determines whether the designated server is overloaded and whether usage consumption assigned to the selected host is within threshold usage consumption, and the main server layer redirects the selected request upon determination that the designated server is overloaded where the selected request redirected from the main server layer is modified to associate with a different class when the usage consumption is beyond the threshold usage consumption;
   wherein upon processing the selected request redirected from the main server layer, the auxiliary server layer sends a response to the selected request.

2. The scalable hosting platform of claim 1, wherein the main server layer comprises a monitoring unit configured to monitor a real-time status of the designated server.

3. The scalable hosting platform of claim 1, wherein the auxiliary server layer comprises a plurality of server layers that includes a first auxiliary server layer and a second auxiliary server layer, the second auxiliary server layer operating as an auxiliary layer for the first auxiliary server layer and removably coupled to the first auxiliary server layer.

4. The scalable hosting platform of claim 3, wherein the first auxiliary server layer is remotely located from the second auxiliary server layer.

5. The scalable hosting platform of claim 1, wherein the auxiliary server layer comprises a plurality of server layers having a first server layer and the first server layer includes a plurality of first servers and a first manager, the first manager assigning the requests redirected from the main server layer to the first servers based on status of the first servers.

6. The scalable hosting platform of claim 5, wherein the plurality of server layers further comprises a second server layer that includes a second manager and a plurality of second servers, the second manager assigning the requests redirected from the main server layer to the second servers based on status of the second servers.

7. The scalable hosting platform of claim 5, wherein the first manager monitors the first servers and changes configuration of the first servers based on the status of the first servers, the configuration of the first servers comprising grouping of the first servers associated with classifications of the requests.

8. The scalable hosting platform of claim 7, wherein the first manager designates one group of the first servers and further designates a server of the designated group for processing the redirected requests based on the changed configuration.

9. The scalable hosting platform of claim 7, wherein each request is sent to one of groups of the first servers based on a classification of the request.

10. The scalable hosting platform of claim 7, wherein a classification of the requests is represented with an identification.

11. The scalable hosting platform of claim 10, wherein the identification comprises one of internet protocol ("IP") address and a domain name.

12. The scalable hosting platform of claim 1, wherein the auxiliary server layer comprises one or more servers and a plurality of virtual servers, the virtual servers processing the redirected requests with physical resources of the one or more servers.

13. The scalable hosting platform of claim 1, wherein the auxiliary server layer is located remotely from the main server layer.

14. A scalable hosting platform, comprising:
   a first server of a first layer that serves one or more hosts wherein a designated server of the first server is associated with a selected host and responds to a selected request to the selected host from a client;
   a monitoring module that monitors the designated server and determines an overloaded condition of the designated server wherein the monitoring module classifies the selected request to determine a quality of service;
   wherein the monitoring module resides in the designated server and the designated server redirects the selected request in response to the overloaded condition;
   wherein the monitoring module determines whether usage consumption of the selected host is within assigned usage consumption and the selected request redirected from the first layer is modified to associate with a different class when the usage consumption is beyond the assigned usage consumption;
   a second server of a second layer that processes requests including the selected request upon redirection of the requests from the first layer, the second server being independently unavailable to the client; and
   a manager that monitors a status of the second server, the manager identifying a group of the second server associated with a classification of the request and dynamically changing the association based on the status of the second server.

15. The scalable hosting platform of claim 14, wherein the second layer comprises a plurality of server layers that includes a first auxiliary server layer and a second auxiliary server layer, the second auxiliary server layer operating as an auxiliary layer for the first auxiliary server layer and removably coupled to the first auxiliary server layer.

16. The scalable hosting platform of claim 15, wherein the designated server redirects the request by using one of proxying, application redirection, network address translation ("NAT"), Layer 4 load balancing and Layer 7 load balancing.

17. The scalable hosting platform of claim 16, wherein the second server layer comprises a first group associated with a first classification and a second group associated with a second classification and wherein the manager changes the association of the first and second server groups with the first classification and the second classification, respectively.

18. The scalable hosting platform of claim 17, wherein servers of the second group is changed to be associated with the first classification to the extent that the quality of service relevant to the second classification is preserved.

19. The scalable hosting platform of claim 14, wherein the manager comprises:
   a monitor unit that monitors a real-time status of the second server;
   a configurator that changes the association of the second server with the classification based on monitoring of the monitor unit.

20. The scalable hosting platform of claim 19, wherein the configurator designates -grouping of the second server and indicates availability of a particular server within each server group.

21. The scalable hosting platform of claim 19, wherein the manager further comprises a distributor that distributes the request to a server of one group of the second server based on the changed association by the configurator.

22. The scalable hosting platform of claim 20, wherein the manager further comprises an assigning module that receives the request and identifies the classification of the request, the assigning module mapping the classification of the request to the grouping of the second servers.

23. The scalable hosting platform of claim 14, wherein the classification comprises information that indicates a determined quality of service of the request.

24. The scalable hosting platform of claim 14, wherein the classification is performed based on an URL of the request, a domain name of the request, an IP address of the request, an application level data of the request, usage consumption of the one host, or a combination thereof.

25. The scalable hosting platform of claim 14, wherein the first server comprises a plurality of servers and the monitoring module is disposed in each server of the plurality of servers.

26. The scalable hosting platform of claim 14, wherein the first server comprises multiple servers and the monitoring module is disposed in the multiple servers among the first server.

27. A scalable hosting method, comprising:
   receiving an internet request at a first hosting server of a first layer from a client;
   subsequent to receipt of the internet request, monitoring a status of the first hosting server to determine whether the first hosting server is overloaded and usage consumption assigned to the first hosting server is within threshold usage consumption;
   redirecting the internet request by the first hosting server of the first layer to a second hosting server of a second layer upon determination that the status of the first hosting server is overloaded,
   wherein the second hosting server is independently unavailable to the client;
   modifying a classification of the redirected request when the usage consumption of the first hosting server is beyond the threshold usage consumption;
   assigning the redirected request to the second hosting server when the second hosting server has the classification consistent with the classification of the redirected request and the second hosting server is available;
   monitoring a status of the second hosting server; and
   assigning the redirected request to a third hosting server of a third layer when the second hosting server is overloaded, wherein the classification of the third hosting server is changed to have the classification of the redirected request.

28. The scalable hosting method of claim 27, further comprising determining that the request is subject to an internal redirection or an external redirection.

29. The scalable hosting method of claim 28, further comprising prior to the external redirection, classifying the request such that a classified request is identified with a network address.

30. The scalable hosting method of claim 27, further comprising adding a new server if all of the first, second and third hosting servers are overloaded.

31. The scalable hosting method of claim 27, further comprising dynamically and constantly changing configuration of the second and third hosting servers associated with classifications of the requests based on the status of the second and third hosting servers.

* * * * *